United States Patent
Frankenberger

(10) Patent No.: US 7,994,972 B2
(45) Date of Patent: Aug. 9, 2011

(54) METHOD AND APPARATUS FOR OPERATING A NAVIGATION SATELLITE SYSTEM

(75) Inventor: Harald Frankenberger, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 392 days.

(21) Appl. No.: 12/393,759

(22) Filed: Feb. 26, 2009

(65) Prior Publication Data
US 2010/0019961 A1 Jan. 28, 2010

(30) Foreign Application Priority Data
Feb. 27, 2008 (DE) .......................... 10 2008 011 388

(51) Int. Cl.
*G01S 19/02* (2010.01)
*G01S 19/41* (2010.01)
*G01S 19/42* (2010.01)
(52) U.S. Cl. ........ 342/357.395; 342/357.24; 342/357.25
(58) Field of Classification Search ............. 342/357.21, 342/357.24, 357.25, 357.395; 701/207, 213
See application file for complete search history.

(56) References Cited

U.S. PATENT DOCUMENTS

| | | | | |
|---|---|---|---|---|
| 4,918,609 | A * | 4/1990 | Yamawaki | 701/207 |
| 5,506,781 | A * | 4/1996 | Cummiskey et al. | 701/226 |
| 6,816,705 | B1 * | 11/2004 | Quan et al. | 455/12.1 |
| 2009/0315772 | A1 * | 12/2009 | Wengler et al. | 342/357.15 |

OTHER PUBLICATIONS

Aram, M. et al., "Improving Position Estimates from a Stationary GNSS Receiver Using Wavelets and Clustering", IEEE, May 2006, pp. 758-762.

* cited by examiner

*Primary Examiner* — Dao L Phan
(74) *Attorney, Agent, or Firm* — Crowell & Moring LLP

(57) ABSTRACT

A satellite navigation system generates a smooth and flexible parameterization of satellite orbits and/or clock corrections. The satellite orbit(s) and/or the satellite clock corrections, are described by a first function system of advancing differentiable functions having a high approximation quality and long range of influence. Satellite orbits and/or clock corrections parameterized from the first function system are transmitted from a central ground processing unit to satellite(s) and then to a user device. (Alternatively, transmission may be effected via only a ground infrastructure.) In addition, a second advancing function system of at least continuous functions of moderate approximation quality and a very short range of influence may be provided, which permits a conversion to the first function system, particularly via the user terminal. Thus, the time required to determine the first navigation information (the time to the first fix) can be significantly shortened.

16 Claims, 10 Drawing Sheets

__US 7,994,972 B2__

METHOD AND APPARATUS FOR OPERATING A NAVIGATION SATELLITE SYSTEM

BACKGROUND AND SUMMARY OF THE INVENTION

This application claims the priority of German patent document 10 2008 011 388.3-55, filed Feb. 27, 2008, the disclosure of which is expressly incorporated by reference herein.

The present invention relates to a method and apparatus for operating a navigation satellite system, and in particular for parameterization of satellite orbits and/or for satellite clock corrections.

Determination of the position of a user terminal by means of pseudo ranges to navigation satellites, requires knowledge concerning the satellite orbits and the timing of corresponding satellite clocks (the two types of information being time-dependent). The GPS System (Global Positioning System), for example utilizes this type of knowledge. The conventional method of providing such information consists of the satellite-based dissemination of so-called osculating Keplerian orbital elements, including several additional corrections for representing the satellite orbits, as well as of polynomials of the second degree for the correction of the time inherent to the satellites.

These types of information, which are part of the so-called navigation message, represent only temporarily usable approximations. That is, their validity basically commences with their dissemination, and ends upon the reception of the next valid navigation message. Although a later use of the information is conceivable, the quality of the approximation diminishes with increasing use duration.

Correspondingly, this approach also applies to the GLONASS satellite navigation system, which is an alternative to the GPS, with the exception that, instead of the Keplerian elements, in this case, positions and velocities are sent which are used as initial values for the numerical integration of the satellite movement equations.

The provided satellite orbits and the satellite clock corrections are therefore piecewise-defined functions of time; there is no secondary condition during the transition from one time interval of the time line to the adjacent time intervals. This may be considered to be a generalization of the known piecewise polynomial splines.

The foregoing method of providing the necessary types of information for determining the position of the user terminal has several disadvantages, as follows:

There is a discontinuity during the transition from one navigation message to another, which may become noticeable as jumps of up to several meters in the determined satellite position and of several nanoseconds in the determined satellite clock time.

Updating of the necessary information requires the reception of all information of the pertaining segment of a navigation message. The use of earlier information is not provided.

In the least favorable case, determination of the position of the user terminal is not possible before a valid navigation message has been received completely. The pertaining time duration significantly determines the time to the first fix of the user terminal or acquisition time.

The precision of the navigation message cannot be increased without increasing its transmission frequency.

The navigation message is oriented especially toward the representation of Keplerian orbits: its flexibility for the purpose of describing trajectories of a different kind is very low.

Some situations exist where these disadvantages complicate or even prevent the navigation by means of satellites; for example:

Monitoring potential movements of so-called reference stations by means of techniques which are differential with respect to time becomes difficult because of the discontinuity during the transition from one navigation message to another, since such discontinuities dominate the remaining differential behavior.

A so-called cold start may result in very high demands on the acquisition time for the most varied navigation applications. These include, for example, tracking whales by receivers mounted on the animal, underwater start of submarine-based rockets or cruise missiles, the departure of aircraft-based proximity weapons and vehicle navigation in city areas. What all of these applications have in common is navigation by means of satellites and the demand for a first fix which is as fast as possible but which, as a rule, must follow a cold start because a view of the satellites before the corresponding event is either impossible or at least difficult.

It is therefore an object of the present invention to provide a method and apparatus for generating a sufficiently smooth and very flexible parameterization of satellite orbits and/or satellite clock corrections of a satellite.

Another object of the invention is to provide such a method and apparatus which permits an increase of the precision of the satellite position that can be calculated at the user terminal.

These and other objects and advantages are achieved by the method according to the invention, in which a first system of advancing differentiable functions (herein referred to as a first function system) with a high approximation quality and a long range of influence is provided to describe the satellite orbits and/or of the satellite clock corrections. As shown in FIG. 10, the satellite orbits and/or satellite clock corrections parameterized from the first function system are transmitted by a central ground processing unit 7 to one or more satellites 2 and then to a user device 6. Alternatively, the transmission may take place only by way of a ground infrastructure, without utilizing the space segment.

The system according to the invention for generating a sufficiently smooth and very flexible parameterization of satellite orbits and/or satellite clock corrections includes apparatus for implementing the method according to the invention.

As a result of the approach according to the invention, jumps in the disseminated satellite position and satellite velocity can be eliminated during changing of the messages sent by a navigations satellite, so that the position and velocity of the user terminal can be determined more easily and precisely. In addition, it becomes possible to use processing techniques that are differential with respect to the time.

Furthermore, the method according to the invention helps to shorten the necessary transmission time and transmission frequency of the navigation message from the ground station to the satellite, achieving an increase in the precision of the navigation message, without increasing the transmission time or transmission frequency. In addition, the method according to the invention achieves much greater flexibility when parameterizing satellite orbits and/or the satellite clock corrections. Thus, trajectories other than the conventional orbits can also be treated, such as those of non-stationary pseudolites (ground-based additional transmitters which can be used alone or in addition to navigation satellites.)

According to an embodiment of the invention, in addition, a second advancing system (referred to herein as a second function system) of at least continuous functions with a moderate approximation quality and a very short range of influence is used to parameterize the satellite orbits and/or to correct satellite clocks, such that a conversion to the first function system in particular by the user terminal is possible. It is thus advantageous that, for the second function system, all data in the satellite which are to be transmitted to the user system are obtained from the first function system. As a result, the transmission load from the central ground processing unit to the satellite are not increased by the second function system. By providing the second function system, the time within which the first navigation information is available (i.e., the time to first fix) can be significantly shortened.

In the method according to the invention, the functions of the first and/or second function systems are sufficiently smooth. That is depending on the applicable requirement, for example, they may be continuous, differentiable or continuously differentiable several times. They may even be continuously differentiable infinitely often.

It is also advantageous that there is one preset (finite) value respectively for both function systems, which value limits the number of the nonzero functions at an arbitrarily selected point in time. As a result, a user terminal requires no more than one fixedly preset amount of information at any point in time.

According to a further advantageous embodiment of the method of the invention, the approximation of the satellite orbits and/or of the satellite clock corrections takes place in an advancing manner. That is, when an approximation is started at a special time interval, the progression of this time interval by a preset time period means that several functions (of the function system) which were necessary for the start, are now no longer required. As a result, these functions will never again make a contribution at a considered point in time, while several new functions will contribute for the first time.

According to a further embodiment of the invention, the instructions for generating the first and the second function system permit control of the quality of the approximation and/or the above-mentioned number of functions. For a so-called rapid cold start (i.e., a short time to which the first fix is present), a simple and suitable conversion between the first and the second function system should be possible in both directions.

According to an embodiment of the invention, polynomial B-splines, non-uniform rational B-splines (so-called NURBS), generalized B-splines (such as the so-called Chebyshev B-splines) or so-called wavelets with a local support can be used as a first and/or second function system.

The approximation of the satellite orbits and/or of the satellite clock corrections are advantageously determined by means of a linear combination of the functions of the first function system. For this purpose, an approximating linear combination of a preset function is first determined at an arbitrary starting interval, only for that starting interval. This supplies the initial coefficients of the first function system. Furthermore, a subsequent interval (that is, following the starting interval) is determined such that the end points of the subsequent interval differ from the end points of the starting interval. The approximation of the preset function is then determined for the subsequent interval in that, except for the coefficients obtained so far, only information of the function for the subsequent interval has an influence. All additional coefficients for further subsequent intervals are inductively determined in an analogous manner.

In addition, in the method according to the invention, differing first and second function systems can be used to approximate the satellite orbits and the satellite clock corrections. Different first and/or second function systems can also be used to approximate the satellite orbits and the satellite clock corrections of different satellites.

According to a further embodiment, when the determined coefficients and additional necessary parameters are uniformly distributed over the time, the time necessary to determine the position of the satellite in the user terminal can be minimized, particularly by way of an independent transmission structure and/or by way of the second function system.

In the method according to the invention, the advancing function systems can be utilized directly within the computation process for restored precise orbits and clocks, and also for the precomputation of orbits and clock corrections. This has the advantage that orbit and clock messages can be generated which a priori are smooth to a certain degree. In addition, the coefficients can be used directly, and the orbit and clock correction data can thereby be provided without losses.

Other objects, advantages and novel features of the present invention will become apparent from the following detailed description of the invention when considered in conjunction with the accompanying drawings.

DETAILED DESCRIPTION

Figure 1:
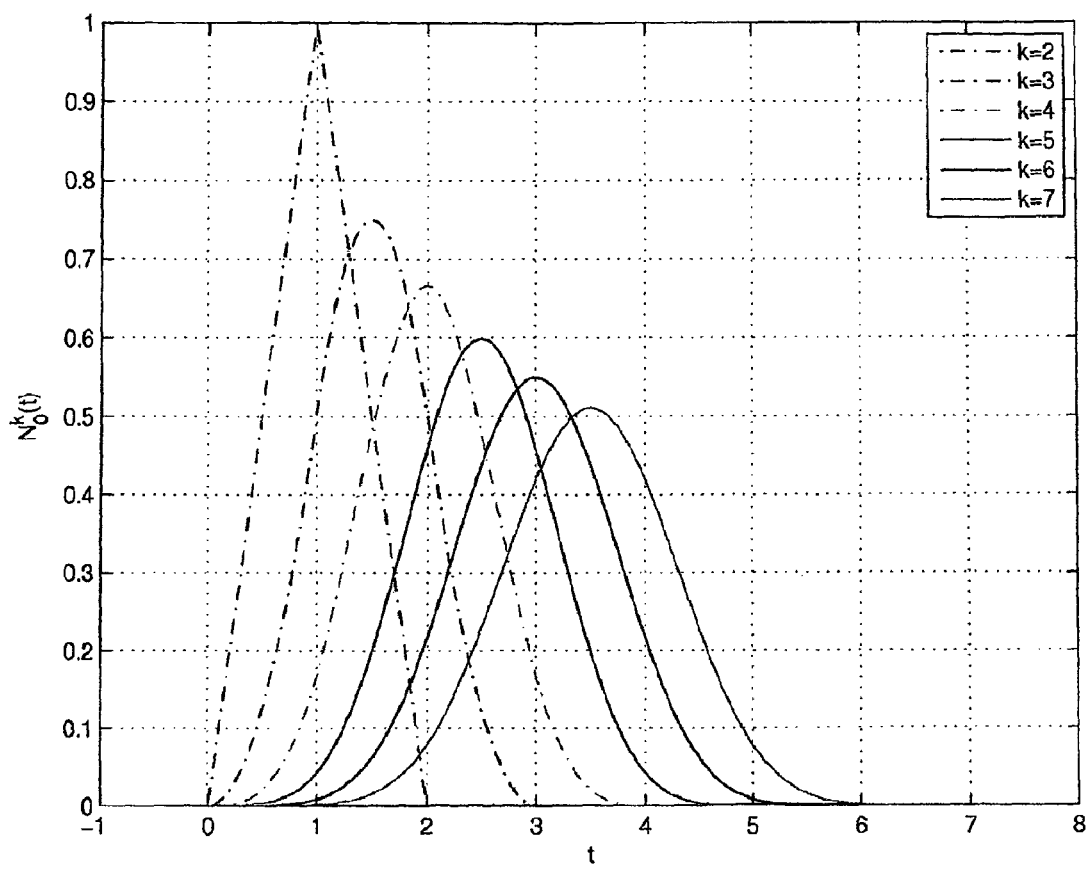
FIG. 1 is a view of normalized polynomial B-splines of different orders in the time slope.

The method according to the invention for generating a sufficiently smooth and very flexible parameterization of satellite orbits and/or satellite clock corrections of a satellite for increasing the precision of the navigation message is based on the use of a system of time dependent functions having the following characteristics:

1. Each function of the function system is sufficiently smooth over the entire time line; that is, depending on the currently applicable requirement, it may, for example, be continuous, differentiable, or continuously differentiable several times, and may even be continuously differentiable infinitely often.

2. The number of functions in the function system which make a contribution at an arbitrary point in time is limited by a constant. (A function contributes at a point in time if its value at that point is nonzero.)

3. The approximation process is implemented in an advancing manner. That is, when an approximation is started for a specific time interval, the advancing of the interval by a preset time period means that several functions of the system (the "older" functions) become obsolete, in that they will never again make a contribution at a relevant point in time. In contrast, several "new" function contribute for the first time. The coefficients resulting from the functions, which are necessary for the approximation and correspond to the functions "between" the obsolete and the new functions, are not influenced thereby.

4. The instructions for generating the function system must permit the control of the quality of the approximation and selection of the number of functions in the system which make a contribution at an arbitrary point in time. The latter signifies the selection of the above-mentioned constant. In order to achieve a rapid cold start (i.e., a short time to the first fix), a simple and suitable conversion should be possible between different definitions of such function systems in both directions.

A general family of function systems, which completely meet the above-indicated Points 1, 2 and 3 and partially meet Point 4, is indicated by the following definition, which is called an advancing function system:

Definition 1:

In the following N represents the natural numbers, including zero, and R represents the real numbers. The natural numbers p and k, a positive number $\alpha$ and an infinite sequence of so-called nodes $(\tau_l)_{l \in N}$, which are not necessarily different in pairs, are given, and wherein the following applies to all $l \in N$: $\tau_{l+k} - \tau_l > \alpha$. The number p may also be infinite. The number $\alpha$ may be called the essential width of the nodes.

A sequence of functions $(\phi_i^{k,p}(\cdot;(\tau_l)_{l \in N}))_{i \in N}$ may be called an advancing function system when the following two properties have been met:

1. For all $i \in N$, the function $\phi_i^{k,p}(\cdot;(\tau_l)_{l \in N})$ can be continuously differentiated p times; i.e., $\phi_i^{k,p}(\cdot;(\tau_l)_{l \in N}) \in C^p(R)$.

2. For all $i \in N$, the so-called support of the function $\phi_i^{k,p}(\cdot;(\tau_l)_{l \in N})$ is contained in the closed interval which is defined by its end points $\tau_i, \tau_{i+k}$; i.e., $$\text{supp}(\phi_i^{k,p}(\cdot;(\tau_l)_{l \in N})) \subseteq [\tau_p, \tau_{i+k}],$$

wherein, for each function f, the support is defined by $\text{supp}(f) := \overline{\{x \in R | f(x) \neq 0\}}$.

In the following, the sequence $(\tau_l)_{l \in N}$ is abbreviated by omitting "$\in N$". Whenever the term "smooth" is used in the text, it means that the functions in question belong to a certain differentiability class, which is not further specified. Examples of such families of function systems are polynomial B-splines, non-uniform rational B-splines (so-called NURBS) and generalized B-splines (such as the so-called Chebyshev B-splines). In addition, so-called wavelets with a local support can fit into this scale.

The approximation is generally implemented by a linear combination of the functions of the selected advancing function system. The coefficients of this linear combination are determined in a manner which depends significantly on the problem to be solved. For example, the quantization of the continuous problem can be solved by Galerkin or collocation methods, and the solution of the resulting discrete problems can take place according to the least squares or according to Chebyshev. Also when the approximation function is an infinite linear combination, the above-indicated definition ensures that the evaluation at any point in time leads to a finite sum.

In the following, the use of an advancing function system is described for the approximation of an arbitrary preset function f on the time line in an advancing manner.

First, an arbitrary initial time interval of the form $[\tau_i, \tau_{i+j}]$ is selected, wherein the following applies: $\tau_{i+j} - \tau_i > 0$. In a conventional manner, the initial approximation of the given function is determined which is limited to this starting interval. This means that only information of the function f is used for points within the starting interval. The start of the construction is thereby illustrated.

Now the further process can be described iteratively. For this purpose, it is assumed that the approximation has been determined originating from the starting interval to a previous time interval $I_{prev}$ (that is, the time interval which was previously the current time interval). Subsequently, the previous time interval $I_{prev}$ is updated such that the new interval end points differ from those of the pertaining old interval $I_{prev}$. On the one hand, there are functions $\phi_i^{k,p}(\cdot;(\tau_l)_l)$, which have made a contribution to the old interval $I_{prev}$ but which make no further contribution at points in time in the subsequent interval $I_{adv}$. (That is, each interior of its supports has a non-empty cut set with $I_{prev}$, but an empty cut set with $I_{adv}$.) For this reason, they are obsolete. On the other hand, there are functions $\phi_i^{k,p}(\cdot;(\tau_l)_l)$, which contribute for the first time. This means that each interior of their supports has a non-empty cut set with $I_{adv}$, but an empty cut set with $I_{prev}$. At least the coefficients of these functions must be determined. With the exception of keeping all or even only almost all coefficients constant, which were determined in the previous step, this is carried out analogously to the initial approximation. In this case again, only information of function f is used for points in time within the current interval $I_{adv}$.

Essentially all already determined coefficients which are called $b_{i_{ess}}^{k,p}$ here, together with the pertaining functions $\phi_i^{k,p}(\cdot;(\tau_l)_l)$, form the known fractions of the approximation of the given function f limited to the interval $I_{adv}$. Then the unknown parts of the approximation of the given function f have to be determined by the approximation of the resulting known function $$f - \sum_{i_{ess}} b_{i_{ess}}^{k,p} \phi_{i_{ess}}^{k,p}(\cdot;(\tau_l)_l),$$

wherein again a limitation takes place to the interval $I_{adv}$.

According to the invention, different advancing function systems can be used to carry out the approximation of a satellite orbit and of a satellite clock time, independently of one another. In principle, different systems can also be used for different satellites.

In the following, a consideration takes place of the distribution of the coefficients of the advancing function system and the effects on the amount of time necessary to complete a first fix (so-called acquisition time). For this purpose, the conventional approach of updating the information with respect to ephemeris and the clock correction will first be explained again. The complete customary approximations are packed into a single information block—a so-called frame—, which is continuously repeated. This is also possible for all coefficients of an advancing function system, which are required for a preset time period.

When the number of bits necessary for the transmission of the coefficients is no greater than in the case of the conventional approach, the same time to the first fix is achieved by the method according to the invention as in the case of a conventional method. As explained above, the updating process for an advancing function system does not require the provision of all necessary coefficients at once. As soon as a sufficient number of previously transmitted coefficients has been stored, it will be sufficient to receive the coefficients in a manner uniformly distributed over the time, so that the new coefficient will be available in time. This represents a very efficient dissemination pattern as long as no special requirement exists with respect to the time to the first fix.

There are two methods for minimizing the time to the first fix when advancing function systems are used:

1. When the coefficients are made available in a manner uniformly distributed over the time, the simplest method of shortening the time to the first fix consists of providing an additional suitable infrastructure in order to, on the one hand, initiate an immediate dissemination of the currently necessary coefficients and, on the other hand, transmit the latter. This approach requires a two-way communication. This method can also be used for the conventional approach of parameterizing a navigation message.

2. The time to the first fix is driven by two values: The repetition rate during the dissemination of all required coefficients, together with reference time information of an individual satellite, and the time period which is required for transmitting the coefficients. The basic idea for reducing these two times is to use two function systems simultaneously which contain the possibility of a mutual conversion.

In this case, the first function system should advantageously have a high approximation quality together with a large significant width Cl of the nodes, whereby a not very small number of required coefficients is implied. This signifies a high time to the first fix, on the one hand, and a very low updating rate for the required coefficients, on the other hand. This first function system is called a "macro advancing function system". The second function system should advantageously combine a very small number of necessary coefficients with a moderate approximation quality. This demand can be met if the coefficients are updated very frequently. The second function system is called a "micro advancing function system". The second function system results in a very brief time to the first fix, as will be illustrated later.

The postulated possibility of the conversion should advantageously imply the capacity for immediate generation of a better representation within the first function system (macro advancing function system) by data cumulation from the second function system (micro advancing function system). Gradually, the coefficients of the first function system, updated based on the advancing time, will determine the approximation, with a smooth transition taking place from the second (micro) to the first function system (macro advancing function system).

In the following, the above-described approach will be explained by means of a concrete embodiment, utilizing so-called normalized polynomial B-splines with simple nodes. In particular, the conversion of the second (micro) function system to the first function system (macro advancing function system) is illustrated. Furthermore, the invention is illustrated by means of numerical examples while using polynomial B-splines by way of an equidistant grid for approximation of real satellite orbits and satellite clock corrections.

Definition 2:

First, a definition takes place of normalized polynomial B-splines with simple nodes. A natural number k, a positive number $\beta$ and an infinite sequence of nodes $(\tau_l)_{l \in N}$, which are different in pairs, are given, wherein the following applies to all $l \in N$: $\tau_{l+1} - \tau_l > \beta$. The number k is called the order of the B-splines and $\beta$ is the minimum distance of the nodes.

It is assumed that $N_i^k(\cdot;(\tau_l)_{l \in N}))_{i \in N}$ is a sequence of functions having the following properties:

1. For each $i \in N$, $N_i^k(\cdot;(\tau_l)_{l \in N})$, piecewise is a polynomial of the degree k−1, 2. For each $i \in N$, $N_i^k(\cdot;(\tau_l)_{l \in N})$ can be continuously differentiated (k−2) times, 3. For each $i \in N$, $N_i^k(\cdot;(\tau_l)_{l \in N})$ is non-negative, 4. For each $i \in N$, $N_i^k(\cdot;(\tau_l)_{l \in N})$ disappears for all points which are not within the interval $[\tau_i, \tau_{i+k}]$. This means that $N_i^k(\cdot;(\tau_l)_{l \in N})$ has a local support, 5. $(N_i^k(\cdot;(\tau_l)_{l \in N}))_{i \in N}$ forms a partition of unity, i.e., $$\sum_{i \in N} N_i^k(\cdot;(\tau_l)_{l \in N}) = 1.$$

Such a function system is called a system of normalized polynomial B-splines with simple nodes. The existence of such a function system is well known. The properties define the function system even unambiguously. Obviously, a system of normalized polynomial B-splines forms an advancing function system according to the invention.

A well-known recursion for n>1 is as follows:

$$N_i^n(\cdot) = \frac{\tau_{i+n} - \cdot}{\tau_{i+n} - \tau_{i+1}} N_{i+1}^{n-1}(\cdot) + \frac{\cdot - \tau_i}{\tau_{i+n-1} - \tau_i} N_i^{n-1}(\cdot),$$

wherein $N_i^1(\cdot)$ assumes the value 1 for points in the interval $[\tau_i, \tau_{i+1}]$ and 0 at all other points. By means of this recursion formula, it can easily be seen that, for each $i \in N$, the function $N_i^k(\cdot;(\tau_l)_{l \in N})$ in the interval $(\tau_i, \tau_{i+k})$ is, in fact, positive.

Figure 2:
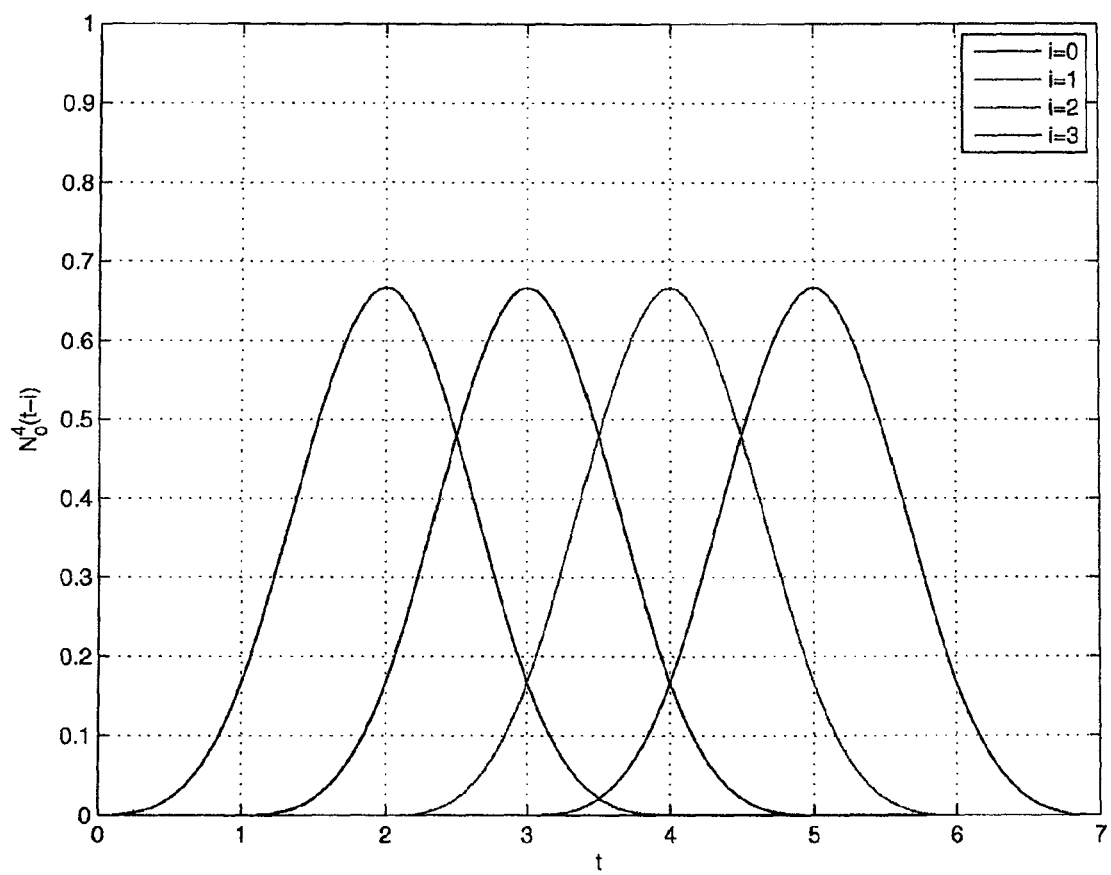
FIG. 2 is a view of cardinal B-splines of the fourth order which make a contribution to an identical interval.
Figure 3:
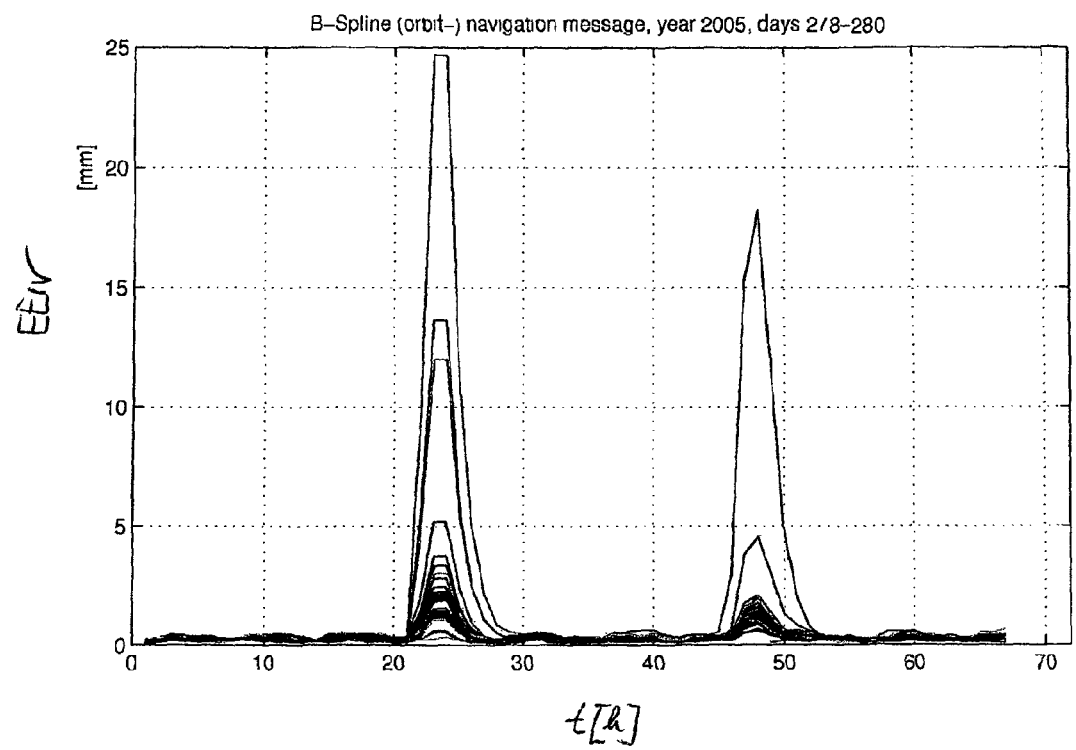
FIG. 3 is a time-related representation of the approximation errors of all GPS satellites of the year 2005 for the days 278 to 280.
Figure 3:
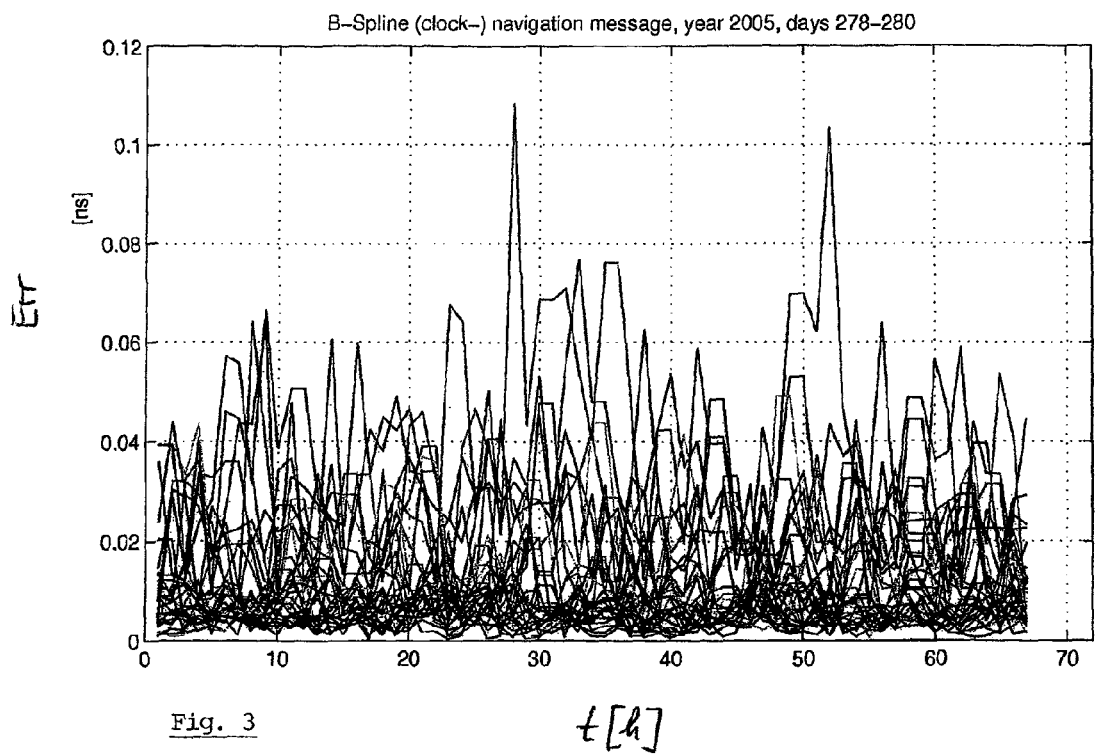
Figure 4:
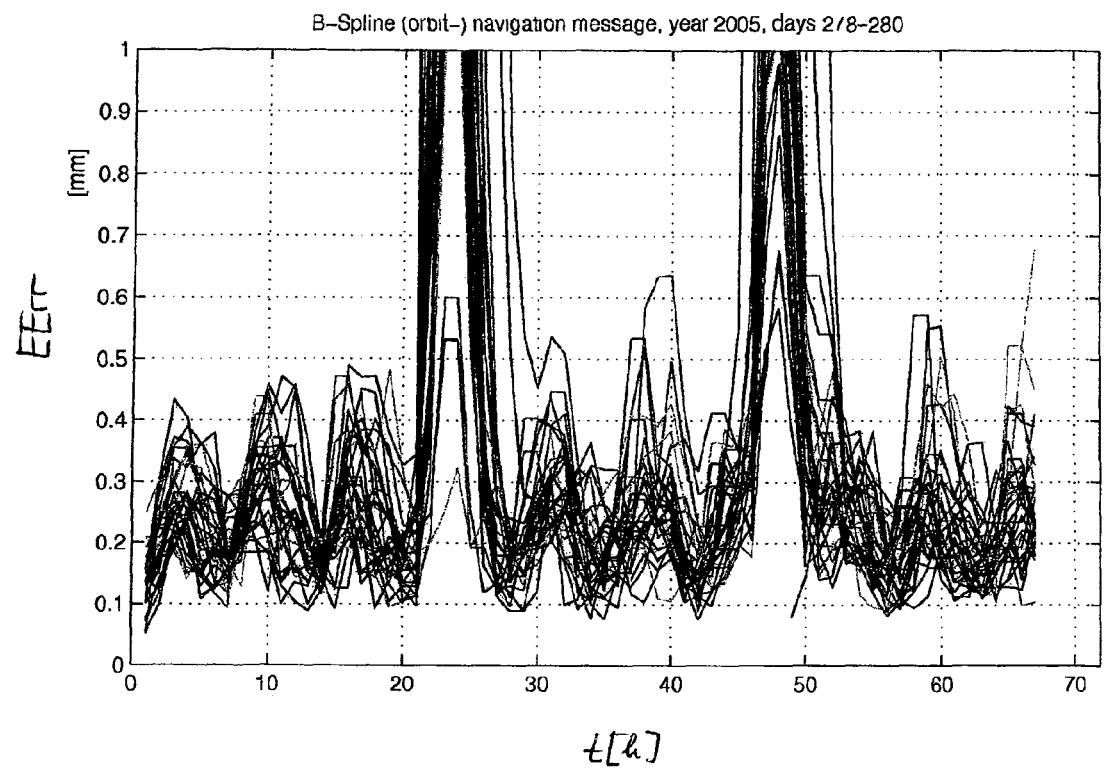
FIG. 4 is an enlarged view of the approximation errors of the year 2005 for the days 278 to 280.
Figure 4:
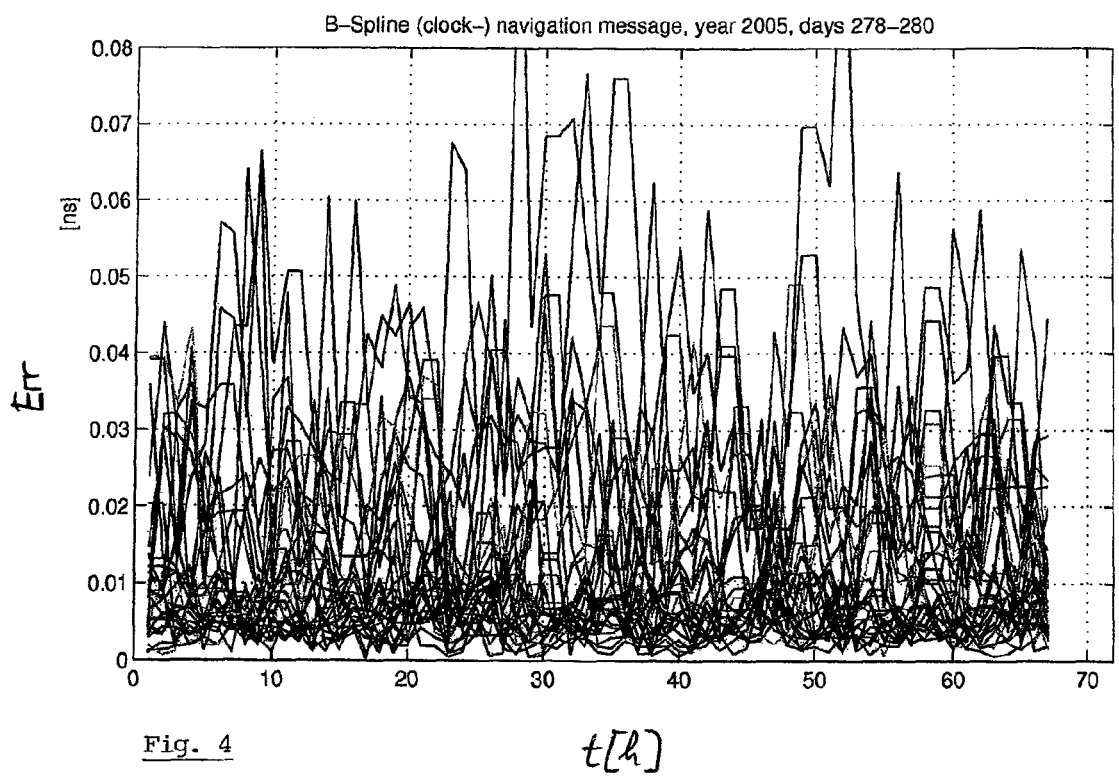
Figure 5:
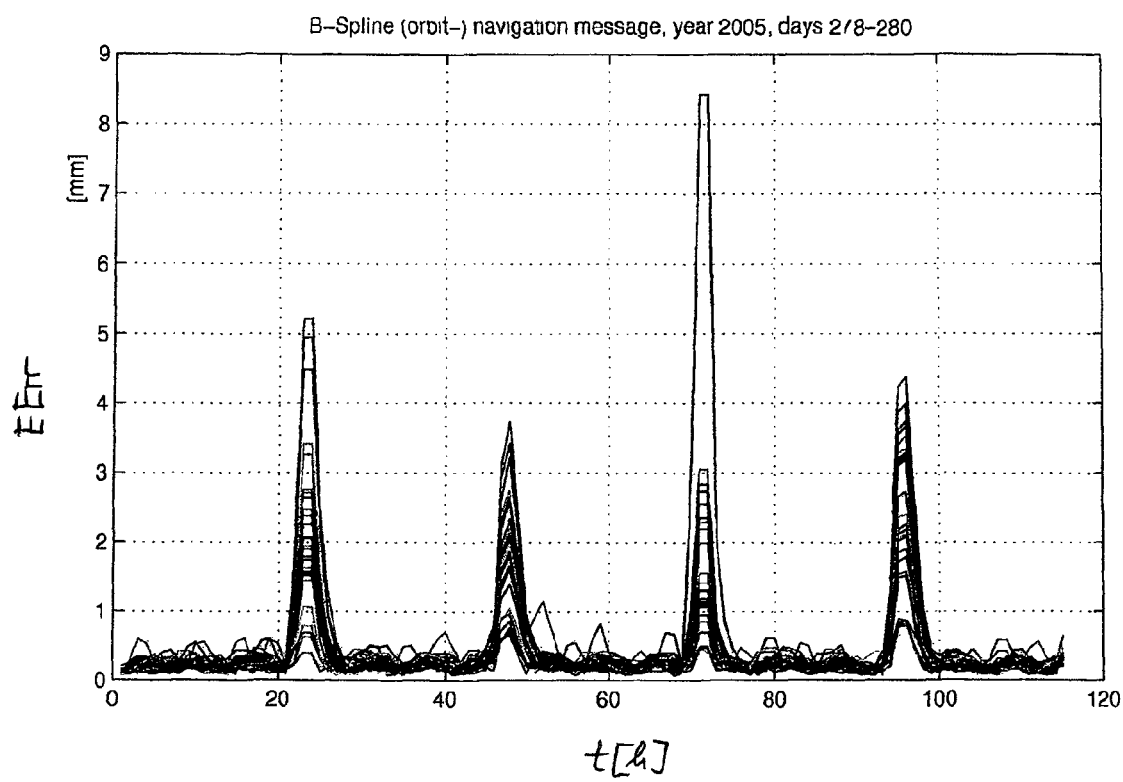
FIG. 5 is a time-related representation of the approximation errors of all GPS satellites of the year 2006 for the days 146 to 150.
Figure 5:
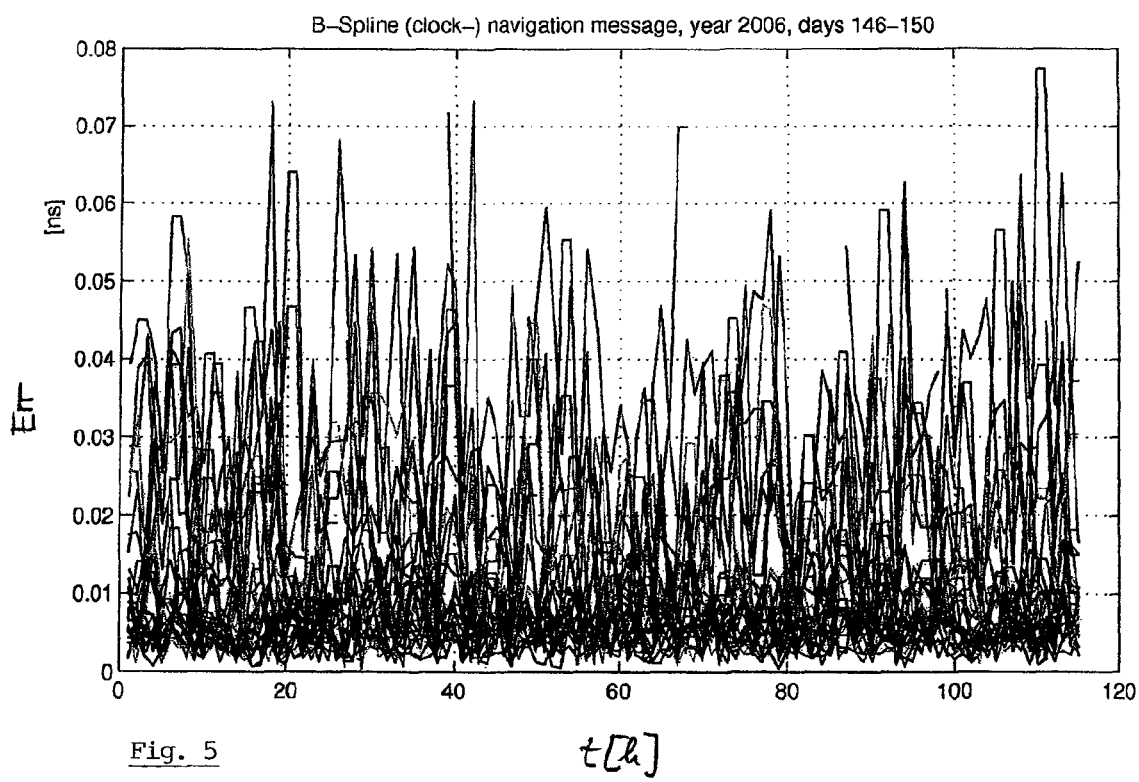
Figure 6:
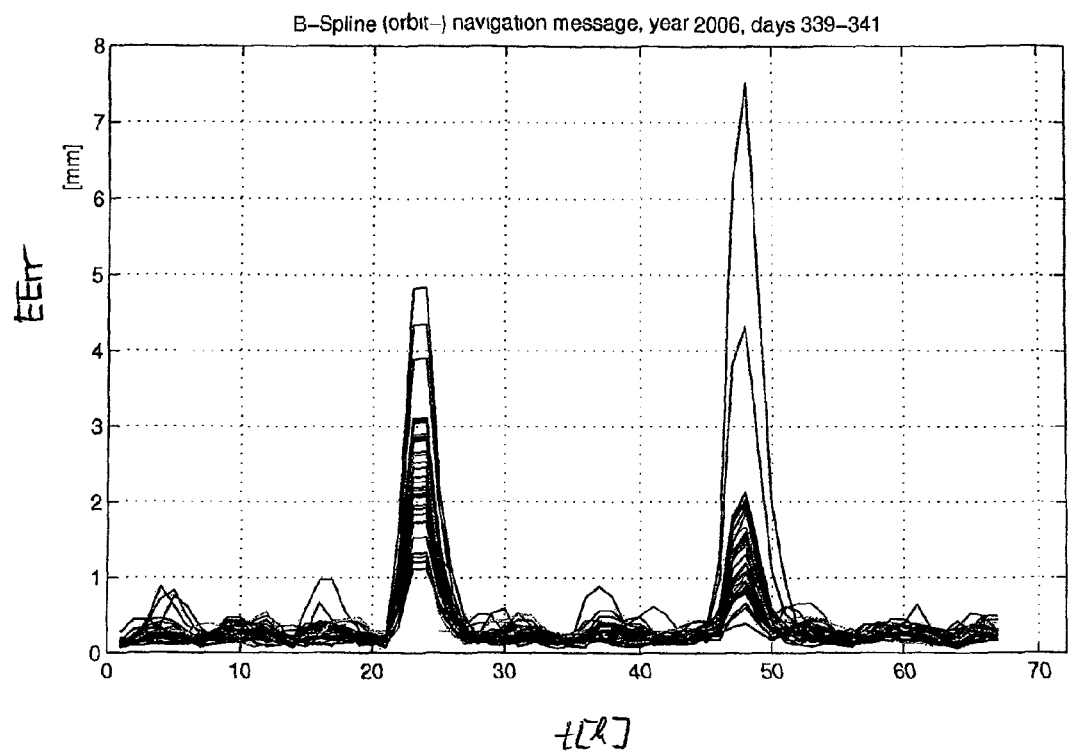
FIG. 6 is a view of the approximation errors of all GPS satellites in the time slope of the year 2006 for the days 339 to 341.
Figure 6:
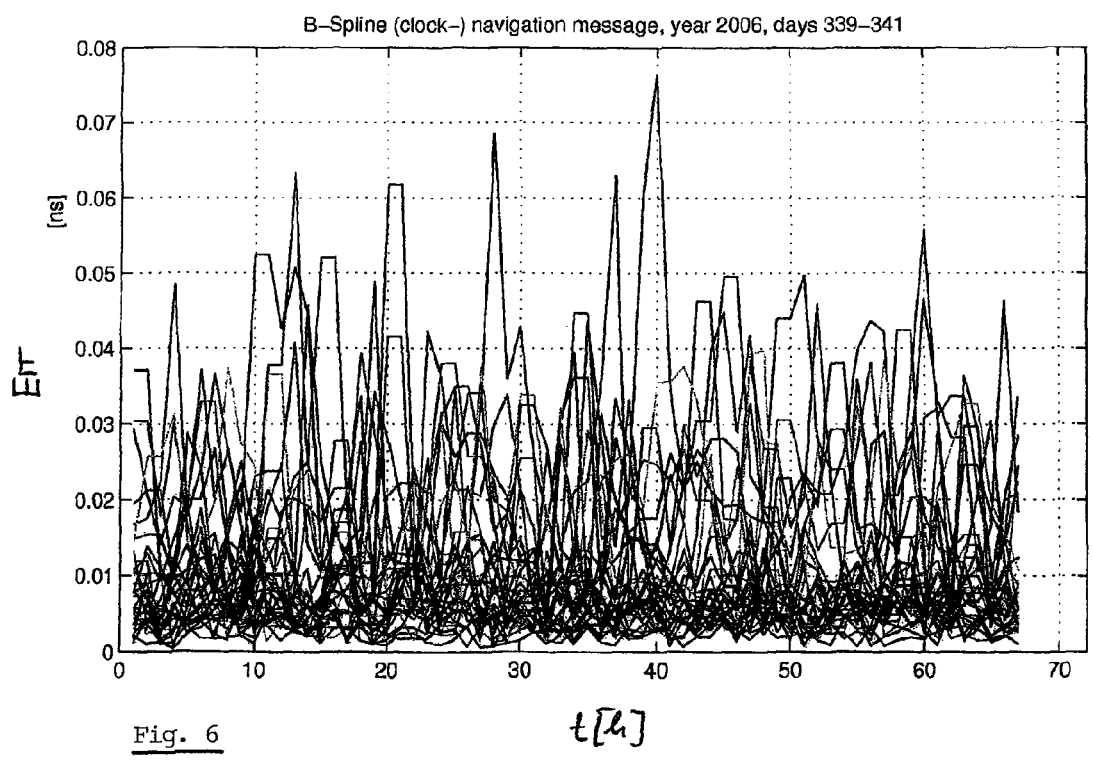
Figure 7:
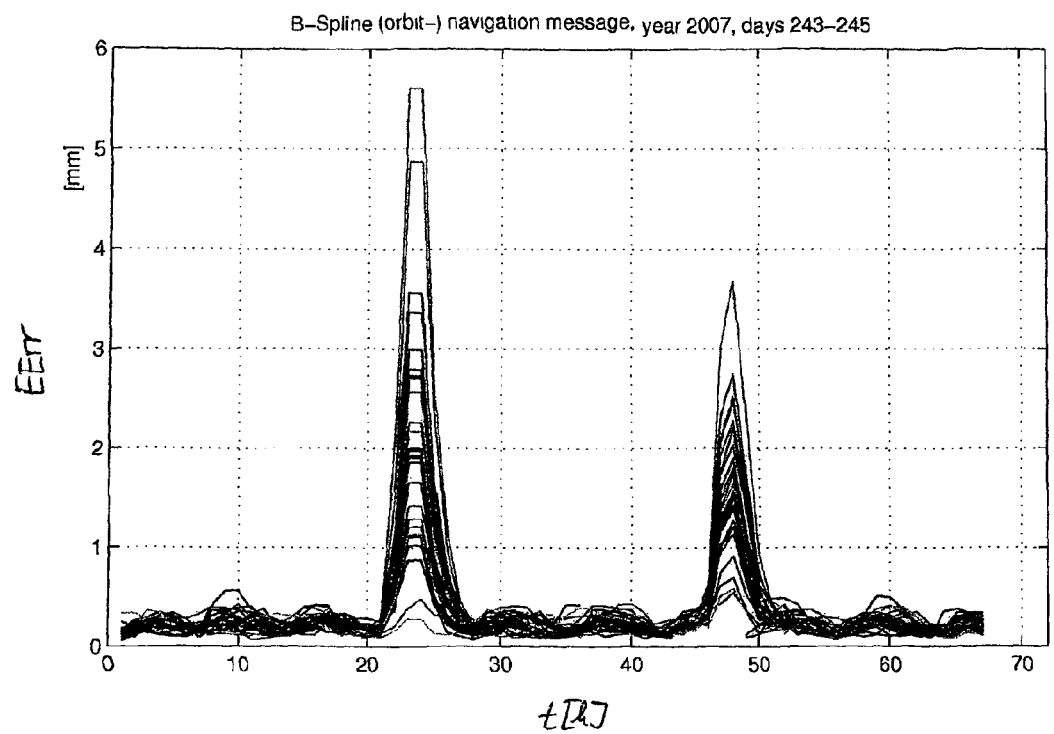
FIG. 7 is a view of the approximation errors of all GPS satellites in the time slope of the year 2007 for the days 243 to 245.
Figure 7:
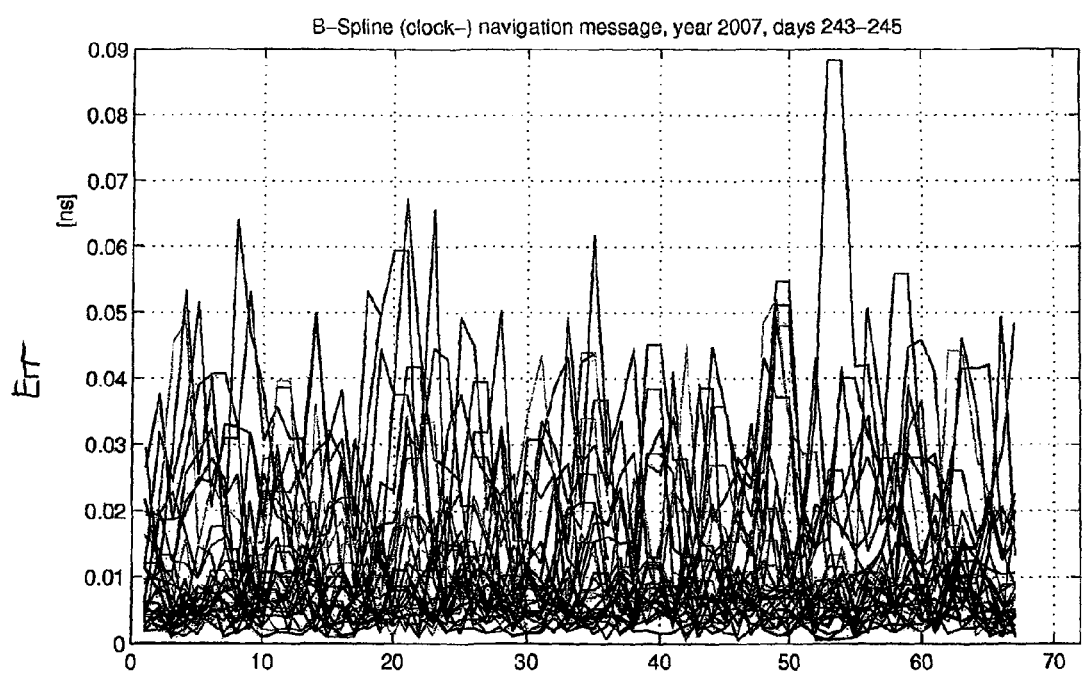
Figure 8:
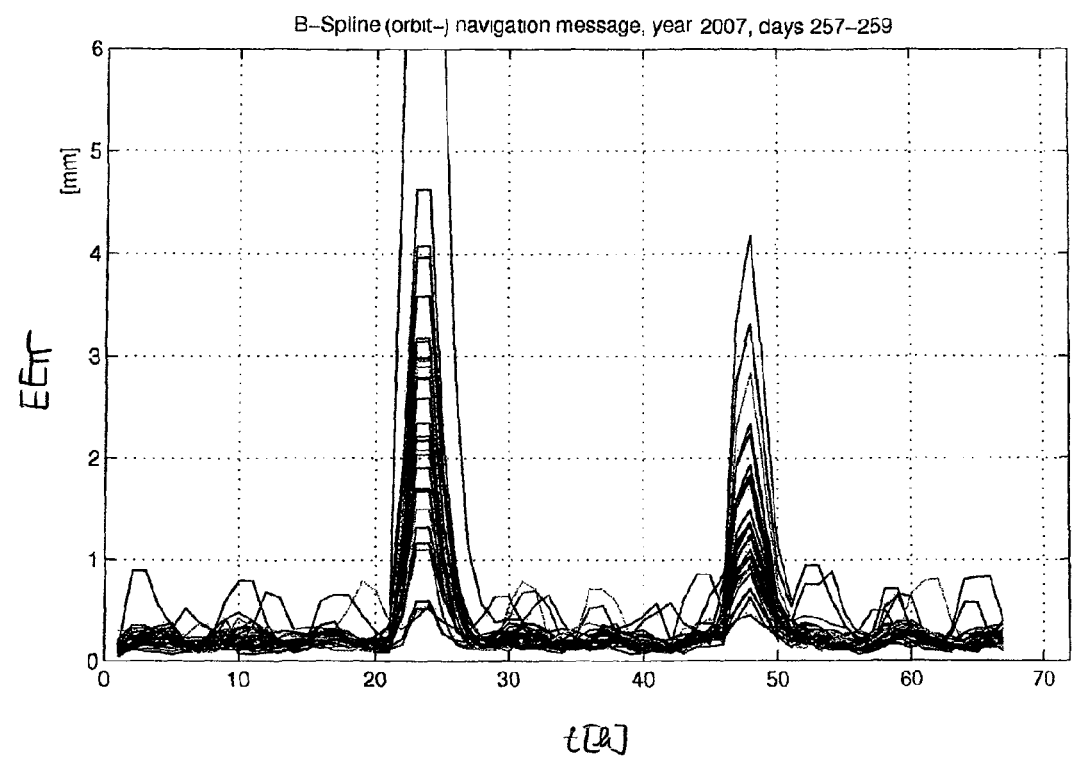
FIG. 8 is an enlarged representation of the approximation errors in the time slope of the year 2007 for the days 257 to 259 with a maximum of 15 mm.
Figure 8:
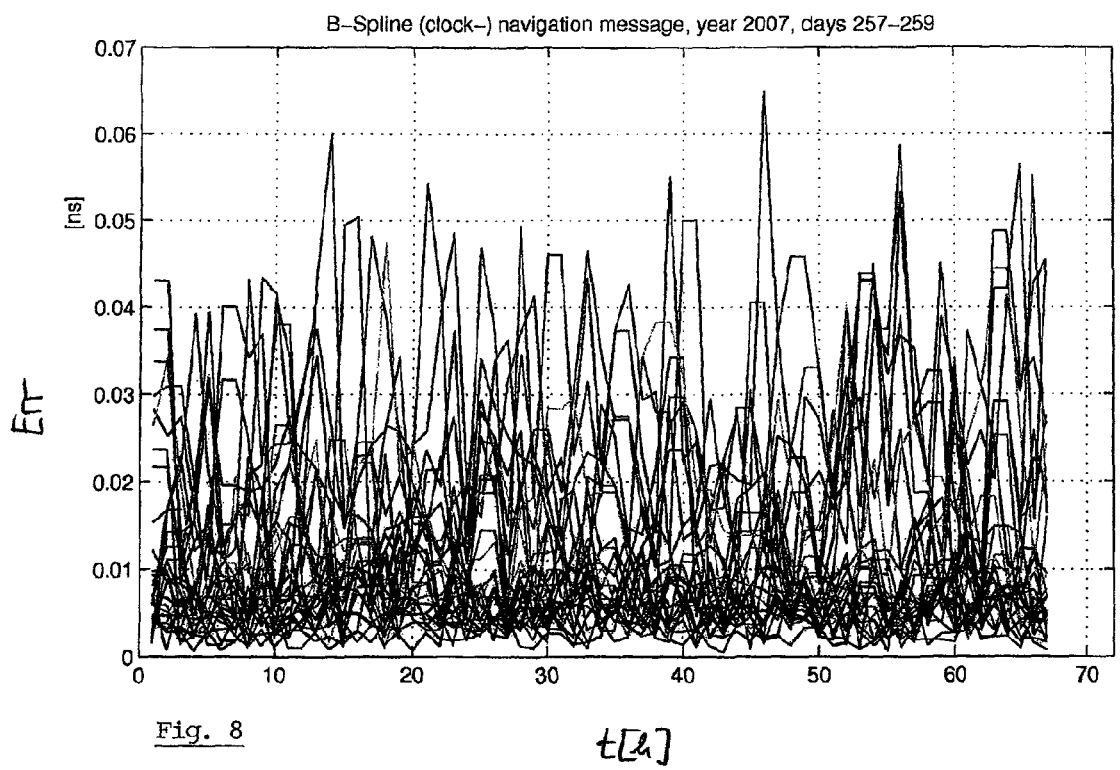
Figure 9:
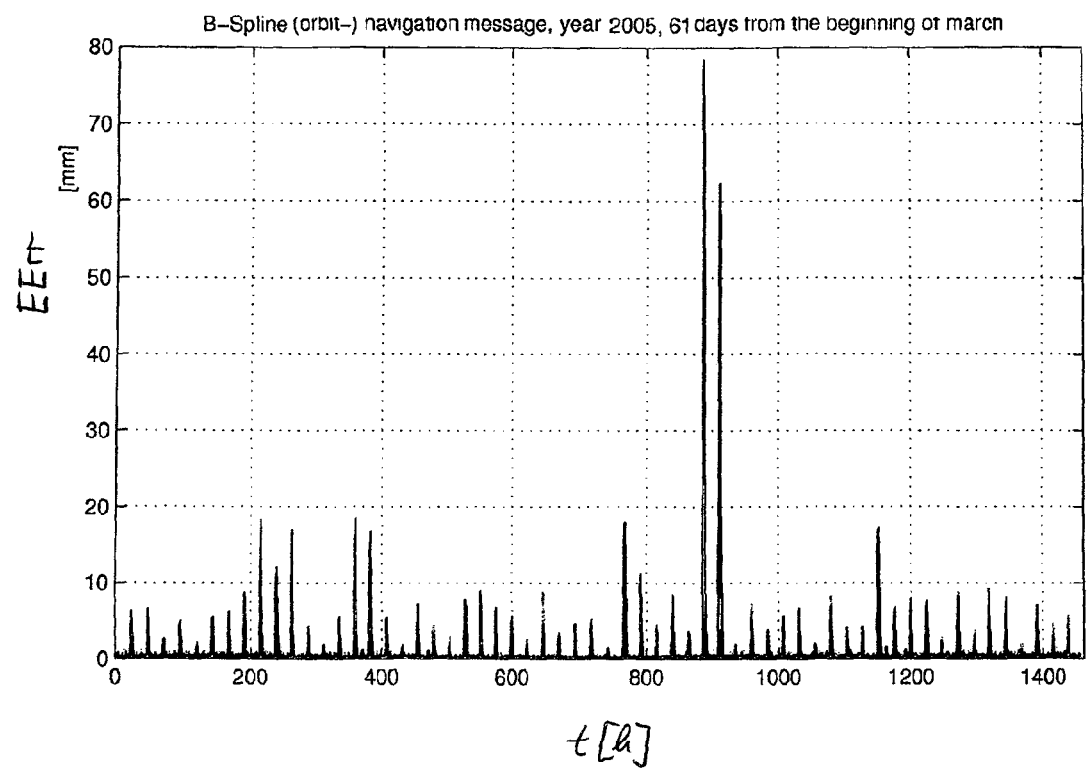
FIG. 9 is a view of the approximation errors of all available GPS satellites in the time slope of the year 2005, showing 61 days, starting on March 1,2005.
Figure 9:
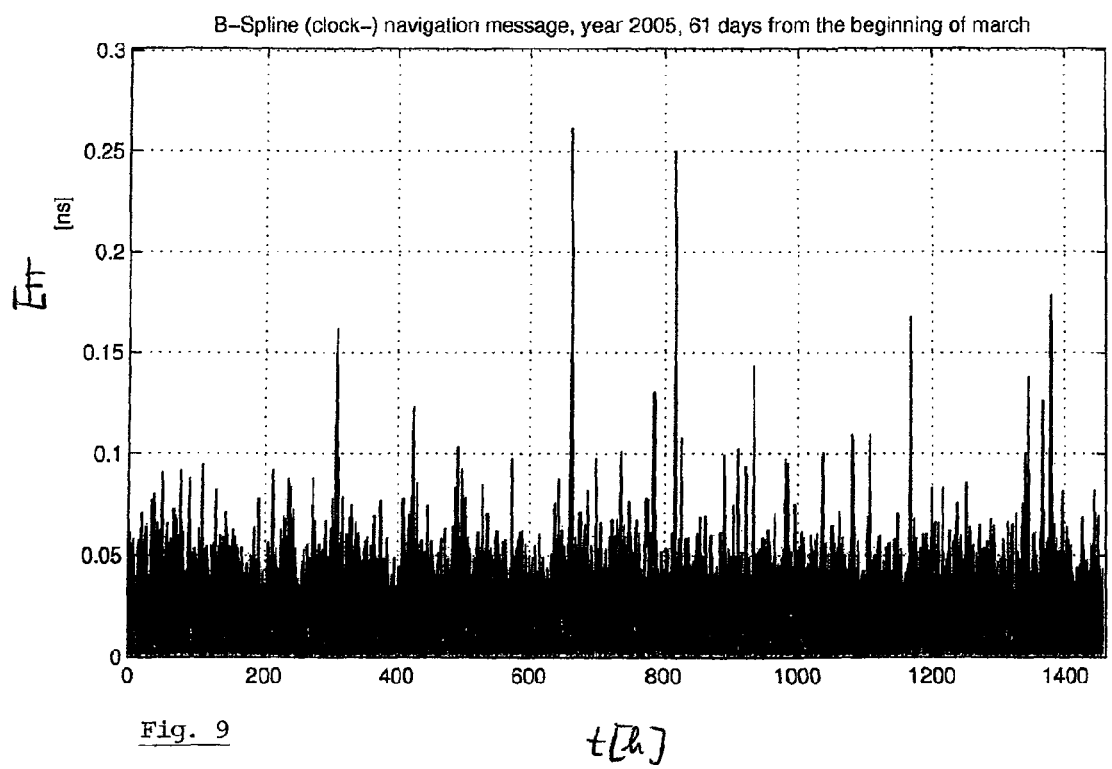

FIG. 1 shows normalized polynomial B-splines of the orders k of 2 to 7 over an equidistant grid with a nodal width of 1 and integral nodes, also known as so-called cardinal B-splines. FIG. 2 shows all those cardinal B-splines of order 4 which contribute to the interval (3, 4).

Before describing the conversion of the second function system to the first function system, in the case of normalized polynomial B-splines with simple nodes, the main characteristics are illustrated which are used for the conversion. For this purpose, an interval of the form $(\tau_j, \tau_{j+q})$ for a nonzero natural number q is used as the basis. The 4th property of the above-indicated Definition 2 has the direct result that precisely the supports of the k+q−1 B-splines $N_{j-k+1}^k, \ldots, N_{j+q-1}^k$ have a non-empty cut set with this interval. In addition, such B-splines have the characteristic that they can be unambiguously determined by way of the interval $(\tau_j, \tau_{j+q})$ by k+q−1 interpolation points $x_{j-k+1}, \ldots, x_{j+q-1}$ when each point $x_i$ is contained in the interval $(\tau_i, \tau_{i+k})$. This is what is required for the process of the conversion. In order to simplify the notation, a finite sequence $\alpha_{i_1}, \ldots, \alpha_{i_2}$ is shown as $(\alpha_i)_{i=i_1}^{i_2}$. Conversion of the Second Function System to the First Function System, i.e., from the Micro Function System to the Macro Function System Two natural numbers m, n with $0 < m << n$ and two sequences of nodes $(t_l)_{l \in N}$ and $(t_l)_{l \in N}$ are given such that the distances of successive nodes of the first sequence are much smaller than those of the second sequence. The pertaining function systems of normalized polynomial B-splines with simple nodes, $(N_j^m(\cdot;(\tau_l)_{l \in N}))_{j \in N}$ and $(N_i^n(\cdot;(\tau_l)_{l \in N}))_{i \in N}$, form a second (micro advancing function system) and a first (macro advancing function system) function system. The coefficients of the second function system have to be determined such that the resulting system interpolates the first function system in the nodes $(t_j)_j$ which are currently taken into account. The coefficients of both systems, i.e., $(b_j^m)_{j \in N}$ and $(b_i^n)_{i \in N}$ are transmitted in a manner uniformly distributed over the time, so that new coefficients of both function systems are in each case available in time. This means that the coefficients $b_{j_0}^m$ and $b_{i_0}^n$ must be sent no later than at the point in time $t_{j0}$ and $\tau_{i0}$. For reasons of simplicity—but without limiting the generality—, it is assumed that the coefficient $b_{i_0}^n$ is sent precisely at the point in time $\tau_{i0}$. The second function system (micro advancing function system) may have a very short time to the first fix, depending on the node distance and on the order m. For the sequences $(t_j)_{j \in N}$ and $(\tau_i)_{i \in N}$ $j_0$ and $i_0$ represent the indices of the respectively largest node, which is smaller than or equal to a time $T_0$ to be considered. This signifies $T_0 \in [t_{j_0}, t_{j_0+1})$ and $T_0 \in [t_{i_0}, t_{i_0+1})$.

Input:
Finite sequences of coefficients $$(b_{j_0+j}^m)_{j=-k_m+1}^0 \text{ and } (b_{i_0+i}^n)_{i=-k_n+1}^0$$

wherein $k_m$ and $k_n$, $k_n < n$, represent natural numbers including 0.

Output:
1. A flag indicating the usability.
2. A finite sequence of coefficients $$(\tilde{b}_{i_0+i}^{\min(k_m-m+2,n)})_{i=-\min(k_m-m+2,n)+1}^0,$$

associated with the node sequence $(\tau_i)_i^0 = -\min(k_m-m+2,n)+1$

Start-Up Phase:
In the case of $0 < km < m$ (which implies that $k_n$ is 0 or 1), the flag is placed such that it indicates non-usability because insufficient information is available.

Transitional Phase, Case 1:
The following applies: $m < k_m < n+m-2$ and $k_n = 0$. The flag is placed such that it shows usability. The $k_m-m+2$ nodes $$(t_{j_0+j})_{j=-k_m+m}^1$$

are all contained in the interval $$(\tau_{i_0}, \tau_{i_0+1}).$$

Because of the demanded interpolation property and the 4th property of Definition 2, the precise values of the first function systems at these nodes are known. At the previous m−1 nodes $$(t_{j_0+j})_{j=-k_m+1}^{-k_m+m-1},$$

this information is not known. For this reason, the interpolation of the $k_m-m+2$ precise values in the pertaining nodes can be carried out by the function system $$(N_{i_0+i}^{k_m-m+2}(\cdot;(\tau_l)_{l \in N}))_{i=-k_m+m-1}^0$$

and results in coefficients $$(\tilde{b}_{i_0+i}^{k_m-m+2})_{i=-k_m+m-1}^0.$$

These represent a polynomial of the degree $k_m-m+1$ over the interval $$[\tau_{i_0}, \tau_{i_0+1}].$$

Because of the unambiguousness of the B-spline representation in the case of the same node sequences, the coefficients $$(\tilde{b}_{i_0+i}^n)_{i=-n+1}^0$$

are identical with $$(b_{i_0+i}^n)_{i=-n+1}^0.$$

This means that, as soon as $k_m = n+m-2$ coefficients of the second function system are available, the required coefficients of the first function system are also known.

Transitional Phase, Case 2:
The following applies: $m < k_m < n+m-2$ and $k_n > 0$. This means that at least one coefficient $b_i^n$ is available. The flag is placed such that it shows this usability. Two possibilities exist for handling this second case.

Strategy A: As soon as the first coefficient of the first function system is available, but simultaneously fewer than $k_m = n+m-2$ coefficients of the second function system are available, all coefficients which had already been received are rejected, and it is necessary to start from the beginning. This approach could have the result that the time to the first fix is doubled.

Strategy B: In this strategy, the interval $$(\tau_{i_0-1}, \tau_{i_0+1}),$$

which certainly comprises all already received nodes, is considered. The n+1 coefficients $$(\tilde{b}_{i_0+i}^n)_{i=-n}^0$$

of all B-spline functions $N_p^n(\cdot;(\tau_l)_{l \in N})$ which contribute to this interval, can be determined by the solution of the following linear equation system:

$\tilde{b}_{i_0}^{n!}=b_{i_0}^{n}$ and the following applies to all $p=j_0-k_m+m, \ldots, j_0+1$:

$$\sum_{i=-n}^{-1} \tilde{b}_{i_0+i}^{n} N_{i_0+i}^{n}(t_p; (\tau_1)_{l \in N}) \stackrel{!}{=} \sum_{j=-k_m+1}^{0} b_{j_0+j}^{m} N_{j_0+j}^{m}(t_p; (t_1)_{1 \in N}) - \tilde{b}_{i_0}^{n} N_{i_0}^{n}(t_p; (\tau_1)_{1 \in N})$$

The resulting system has n unknown variables and $k_m-m+2$ equations. In most cases of $k_m$, this system is underdetermined. It therefore has to be solved in such a manner that a suitable norm $\|\cdot\|$ is minimized (that is, the computed solution minimizes the expression $$\|(\tilde{b}_{i_0+i}^{n})_{i=-n}^{-1}\|$$

among all conceivable solutions $$(\tilde{b}_{i_0+i}^{n})_{i=-n}^{-1}.$$

In the case of $k_m-m+2=n$, the unambiguousness of the B-spline representation on identical node sequences ensures that the coefficients $$(\tilde{b}_{i_0+i}^{n})_{i=-n}^{0}$$

are identical with $$(\tilde{b}_{i_0+i}^{n})_{i=-n'}^{0}.$$

Thus, as soon as $k_m=n+m-2$ coefficients of the second function system are available, the required coefficients of the first function system are also known. The time $T_0$ that is of interest is contained in the interval $[\tau_{i_0}, \tau_{i_0+1})$. The B-spline $N_{i_0-n}^{n}(\cdot; (\tau_1)_{l \in N})$ therefore does not contribute in $T_0$. This means that only the sequence of coefficients $$(\tilde{b}_{i_0+i}^{n})_{i=-n+1}^{0}$$

is necessary and is provided for the output.

Normal Working Phase:

In the case of $n+m-2<k_m$, the flag is placed such that usability is indicated, and the sequence of the coefficients $$(\tilde{b}_{i_0+i}^{min(k_m-m+1,n)})_{i=-min(k_m-m+1,n)+1}^{0},$$

which is provided as the output, is equal to the pertaining input $$(b_{i_0+i}^{n})_{i=-n+1}^{0}.$$

The reason is that, at the end of the transition phase ($n+m-2=k_m$), all coefficients of the first function system are available; i.e., $k_n=n$.

When this output is used, the first function system leads to the desired approximation as a result of the following computation:

$$\sum_{i=-min(k_m-m+1,n)+1}^{0} \tilde{b}_{i_0+i}^{min(km-m+1,n)} N_{i_0+i}^{min(km-m+1,n)}(T_0; (\tau_1)_{1 \in N}).$$

When the number $k_m$ of the obtained coefficients $b_q^{m}$ is larger than m but smaller than $2m-1$ (i.e., $k_m-m+1<m$), it is better to use directly the input of the second function system; i.e., $$\sum_{i=-m+1}^{0} b_{j_0+j}^{m} N_{j_0+j}^{m}(T_0; (\tau_1)_{1 \in N}).$$

Although the coefficients of the first function system can in each case be determined (at least theoretically) as soon as sufficient information was received for the first time by way of the second function system, for numerical reasons, it may be necessary to further repeat this process in parts. This is necessary only for a time period which is no longer than a suitable fraction of the duration of the actual time interval $[\tau_{i_0}, \tau_{i_0+1}]$.

Because of the interpolation characteristic, the above-described process generates a smooth approximation also in the transition phase. In the normal working phase, the approximation can be continuously differentiated (n−2) times.

In the following, several numerical examples will be described, wherein normalized polynomial B-splines are used over an equidistant grid. Now, v is a positive real number and k is a natural number. The defining nodes are stated according to $\tau_l:=l/v$ for all $l \in N$. The resulting B-splines $N_j^{k}(\cdot; (\tau_l)_{l \in N})$, can be expressed by the above-mentioned cardinal B-splines of the same order, $Q^{k}(\cdot)$, since $N_j^{k}(t;(\tau_l)_{l \in N})= Q^{k}(vt-j)$ applies to all $t \in R$.

For the tests illustrated in FIGS. 3 to 9, the respective available GPS satellites were used on different consecutive days, in which case their satellite orbits and satellite clock correction data are given by highly precise post-processing precisely to orders of magnitude of centimeters or 0.1 ns. For the results, which are illustrated in FIGS. 3 to 9, B-splines were used which are supplied by two sets of parameters, one set being applicable to the approximation of the satellite orbits $$\left(k=8 \text{ and } \frac{1}{v}=869\frac{1}{3}\right),$$

and the other set being applied to the satellite clock correction $$\left(k=4 \text{ and } \frac{1}{v}=579\frac{5}{9}\right).$$

Because 1/v represents also the time distance between two consecutive nodes, there is a time distance in minutes of 14:29,33 and 9:39,56 for the nodes which in each case belong to the satellite orbit or to the satellite clock. The time-related length of the supports of the corresponding B-splines is indicated by k/v; i.e., by approximately 116 or 39 minutes.

The approximation process is carried out as described above, in which case a sequence of intervals $(t_0+3600\cdot[l,l+1))_{l \in N}$ is used as essential time intervals $I_{ess}$, $t_0$ representing an arbitrary fixed point in time in seconds. For the pertaining advancing time intervals $I_{adv}$, the time interval $I_{ess}$ is prolonged by two additional hours; i.e., $(t_0+3600\cdot[l,l+3))_{l \in N}$, wherein $t_0$ is defined as previously. In each of FIGS. 3 to 9, for each point in time, the Euclidian approximation error EErr is illustrated in millimeters and Err is illustrated in nanoseconds. In this case, different lines represent different satellites. Larger jumps occur at the change of day. These result from jumps in the data on which they are based. Between the points representing midnight, the approximation error is by approximately one order of magnitude better.

Figure 10:
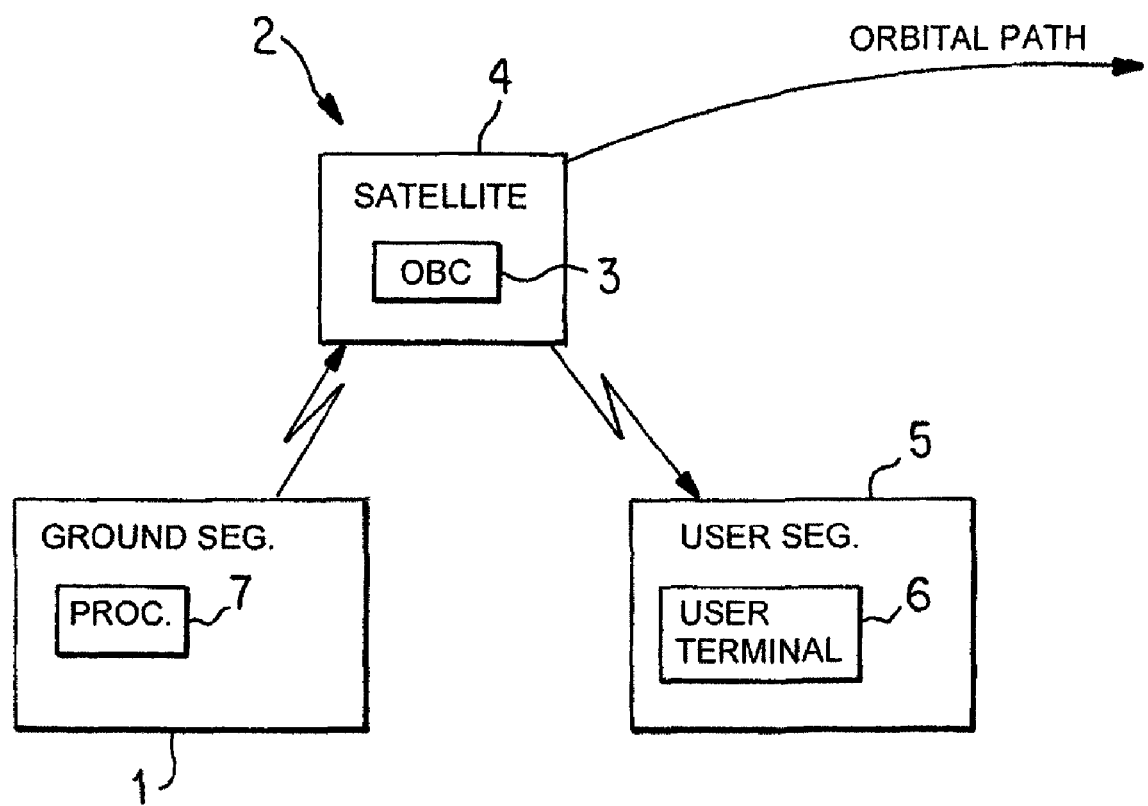
FIG. 10 is a schematic diagram of an embodiment of a system according to the invention for determining the position of a user terminal.

In the following section, additional types of information are supplied as to how the advancing function systems are to be integrated in the overall procedure of the ground segment 1 and space segment 2 of a satellite navigation system, in order to obtain the largest possible benefit therefrom. (See FIG. 10.)

A majority of the computations to be implemented can be carried out by an onboard computer 3 of the satellite 4. When the first function system is known, the second function system can be computed; for example, by an interpolation process as illustrated above in the special case of B-splines. For this reason, it is not necessary to transmit the second function system to the satellite.

A transmission load resulting from an uplink of orbit and clock correction data can be uniformly distributed over the time, so that new coefficients of the first function system will at least be available when they are needed. In addition to the coefficients themselves, only one attribute is required for assigning the pertaining node to each of them. For this reason, average as well as peak values of these uplink loads can be minimized and the duration of an uplink for orbit and clock correction data can be reduced in comparison to methods which send the complete information all at once.

Likewise, the dissemination of advancing function systems from the space segment 2 to the user segment 5 can be implemented in a uniformly distributed manner over the time. The following is required for this purpose:

A vectorial coefficient for the orbit and a scalar coefficient for the clock correction, for each time node $(\tau_l^{orb})_{l \in N}$ and $(\tau_l^{clk})_{l \in N}$ respectively. Both coefficients are part of first function systems and must be provided at the latest at the pertaining time nodes. These nodes must also be disseminated to, or known in, the user terminal 6 in advance. The latter is conceivable, for example, for equidistant grids, where the nodes are indicated a priori by $\tau_l := \tau_0 + l/v$ for arbitrary but fixed numbers $\tau_0$ and $v,v > 0$, and all $l \in N$. When different coefficients of the same first function system are transmitted all at once, information on the assignment to the correct nodes should also be included. When the coefficients are transmitted only for predefined time periods which are known to the user terminal and are mutually disjunct, it will not be necessary to disseminate further assignment information; for example, for equidistant grids, each $b_l$ is disseminated within the time interval $(\tau_{l-1}, \tau_l - \Delta]$, wherein $\Delta$ is a non-negative number smaller than each $\tau_l - \tau_{l-1}$.

A vectorial coefficient for the orbit and a scalar coefficient for the clock correction, for each time node $(\tau_l^{orb})_{l \in N}$ and $(\tau_l^{clk})_{l \in N}$ respectively. Both coefficients are part of second function systems and have to be provided at the latest at the pertaining time nodes. These nodes and all other parameters, which are relevant with respect to the use of the second function system, must be known to the user terminal in advance in order to keep the dissemination load low.

Two sets of parameters which are relevant with respect to the use of the two first function systems when the nodes are defined. In a system of normalized polynomial B-splines with simple nodes, the only relevant parameter, in addition to the nodes, is the order. The conversion of a second to a first function system requires the reception of these parameter sets at least until the first function system is used for the first time. In order to avoid an increase of the time to the first fix, these have to be disseminated correspondingly. In the case of a conversion between a normalized polynomial B-spline with a simple node, the order n has to be transmitted at least each $(n+m-2)^{th}$ time $t_l$. When the order is not transmitted at each point in time $t_l$, Strategy B occasionally cannot be implemented, because the order n is immediately required when Strategy B is to be applied. In this case, the consequence in this occasional case is a change to Strategy A.

It is assumed that each coefficient of an advancing function system, defined by numbers p, k and α and the nodes $(\tau_l)_{l \in N}$, is disseminated $\Delta_k$ seconds before the assigned node. ε is the time between consecutive measuring epochs. For the considered satellite, the first reception of a signal should be situated within the interval $(\tau_{j_0} - \Delta_k, \tau_{j_0+1} - \Delta_k]$. Then the time to the first fix is limited by $\tau_{j_0+k} - \tau_{j_0} + \Delta_k + \epsilon$ seconds, if the time information required for the absolute referencing is transmitted in a corresponding manner, i.e., periodically within the same time. This applies because, in the worst case, the first coefficient can be received at the earliest at the time $\tau_{j_0+1} - \Delta_k$, and then the collection of the next k coefficients that follow, which are generally necessary, implies a waiting to the point in time $\tau_{j_0+k} - \Delta_k$. However, the last received coefficient will not be usable before the time $\tau_{j_0+k}$ has been reached. Then, in the worst case, a time period of another ε seconds could pass until the next measuring epoch is reached. Because the user terminal could have been started close to the time $\tau_{j_0} - \Delta_k$, in the worst case, the time difference would amount to $\tau_{j_0+k} - \tau_{j_0} + \Delta_k + \epsilon$.

This will be illustrated by an example: For normalized polynomial B-splines with simple nodes of the order k=2, which are used as a second function system, $\tau_{j_0+2} - \tau_{j_0} + \Delta_2 + \epsilon$ is obtained. This can be reduced to $2 + \Delta_2 + \epsilon$ seconds when the nodes are indicated by $\tau_l := \tau_0 + l$ for an arbitrary but fixed $\tau_0$ and all $l \in N$. (That is, one coefficient per second must then be disseminated.) Furthermore, the special case of integral measuring epochs with consecutive times $\epsilon = 1s$ will be considered. In order to minimize the above-mentioned time until the reaching of the next measuring epoch after $\tau_{j_0+k}$, it is recommendable to use a number for $-\tau_0$ which is greater than the signal propagation time from any satellite to any user station on the ground, including a margin for inaccurate user clocks of, for example, 100 ms. In this manner, the time to the first fix can be reduced to $2 + \Delta_2 + 0,1$ seconds—when the time information types for the absolute referencing are periodically transmitted at least within the same time. The value of $\Delta_2$ has to be selected between 0 and 1 s.

The separation between the second and first function systems (that is, the micro and macro advancing function systems) makes it possible to meet different combinations of demands concerning the time to the first fix and the approximation quality, in that several different second function systems are used. These can be provided by the utilization of either the same or services other than the service which is used for the first function systems.

For generating a parameterization of satellite orbits and/or satellite clock corrections of a satellite, it is assumed according to the above-implemented method of the invention that these orbits and/or clock corrections are already present in another suitable description, for example, in one of the forms customary for navigation messages or in the so-called SP3 format.

In another embodiment, the advancing function systems can be utilized directly within the computation process for restored (corrected) precise orbits and clocks as well as within the process for the precomputation of orbits and clock corrections. This has the advantage that orbit and clock messages can be generated which a priori are smooth to a certain degree. In addition, the coefficients can be used directly and the orbit and clock correction data can thereby be provided free of losses.

The satellite-based dissemination of precomputed satellite orbits and satellite clocks by navigation messages and the dissemination of precise satellite orbits and clocks by files in the so-called SP3 format are completely different. The use according to the invention of coefficients of an advancing function system permits standardized handling of both data records. For suitable advancing function systems, this applies without reducing the precision and handling capacity. The use of the normalized polynomial B-splines on an equidistant grid from the above-mentioned concrete example leads approximately to reducing the data set in half in comparison to the SP3 format; and handling the data requires no other methods than, for example, the evaluation recursion customary for B-splines.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method or operating a satellite navigation system comprising a ground segment that includes at least a central ground processor, a space segment comprising at least one satellite, and a user segment comprising at least one user device, said method comprising:
   said central ground processor determining at least one of satellite orbit and a satellite clock correction information parameterized from a first function system;
   said central ground processor transmitting said at least one of satellite orbit and satellite clock correction information via a transmission path that is one of i) a direct transmission to said user device and ii) a transmission to said at least one satellite for retransmission to said user device; and
   said user device using said at least one of satellite orbit and satellite clock correction information to determine position of said user device;
   wherein said first function system comprises a first system of advancing differentiable functions that characterize the at least one of satellite orbit and satellite clock corrections, with a high approximation quality and a long range of influence.

2. The method according to claim 1, wherein:
   parameterizing of the at least one of satellite orbit and said satellite clock correction is performed using in addition a second function system comprising a second system of advancing, at least continuous, functions that characterize the at least one of satellite orbit and satellite clock correction information with a moderate approximation quality and a very short range of influence; and
   said second function system permits a conversion to the first function system, by the user device.

3. The method according to claim 2, wherein, for the second function system, all data to be transmitted to the user device are obtained in the at least one satellite.

4. The method according to claim 1, wherein the functions of at least one of the first and second function systems are smooth.

5. The method according to claim 1, wherein:
   the functions of the first function system have local supports; and
   the number of locally contributing functions, which contribute at an arbitrary point in time, is limited to a predefined value.

6. The method according to claim 2, wherein approximation of said at least one of satellite orbits and satellite clock corrections is performed in an advancing manner.

7. The method according to claim 6, wherein at least one of quality of the approximation and the number of locally contributing functions is controlled by controlling instructions for generating the first and the second function system.

8. The method according to claim 2, wherein at least one of said first and second function systems comprises one of polynomial B-splines, non-uniform rational B-splines, generalized B-splines and wavelets with a local support.

9. The method according to claim 6, wherein the approximation is determined by a linear combination of the functions of at least one of the first and the second function systems.

10. The method according to claim 9, wherein:
    a starting interval is determined; and
    approximation of a given function and coefficients of the given function are determined for the starting interval.

11. The method according to claim 10, wherein:
    a following interval, which follows one of the starting interval and a most recent current interval, is determined such that end points of the following interval differ from end points of the starting interval or of the last current interval; and
    the approximation of a given function for the following interval is determined, and in addition to the approximations of the given function determined for previous intervals, one of i) only information with respect to the currently regarded interval, and ii) information with respect to the currently regarded interval also future intervals having an influence.

12. The method according to claim 1, wherein different at least one of first and second function systems are used for approximation of the satellite orbits and of the satellite clock corrections.

13. The method according to claim 6, wherein one of the following is true:
    dissemination of the information takes place in a manner approximately uniformly distributed over time with or without repetitions; and
    dissemination of the information takes place intermittently, and a plurality of coefficients or parameters are disseminated simultaneously, with or without repetition.

14. The method according to claim 12, wherein different first and/or second function systems are used for approximation of the satellite orbits and of the satellite clock corrections of different satellites.

15. The method according to claim 10, wherein, to minimize the time necessary to find the first position of the use device, determined coefficients and additional coefficients are transmitted to the user device in a manner uniformly distributed over the time, via an independent infrastructure.

16. The method according to claim 1, wherein the advancing function systems are utilized directly within the computation process for restoring precise orbits and clocks as well as also within the process for the precomputation of orbits and clock corrections.

* * * * *